United States Patent [19]
Sherer et al.

[11] Patent Number: 6,115,376
[45] Date of Patent: Sep. 5, 2000

[54] MEDIUM ACCESS CONTROL ADDRESS AUTHENTICATION

[75] Inventors: W. Paul Sherer, Danville; Danny M. Nessett, Fremont, both of Calif.

[73] Assignee: 3Com Corporation, Santa Clara, Calif.

[21] Appl. No.: 08/959,833

[22] Filed: Oct. 29, 1997

Related U.S. Application Data

[60] Provisional application No. 60/032,842, Dec. 13, 1996.
[51] Int. Cl.⁷ .............................. G06F 12/00; H04L 12/56
[52] U.S. Cl. ......................... 370/389; 370/407; 713/201; 709/224
[58] Field of Search .................................. 370/242, 245, 370/252, 389, 400–401, 407; 713/201; 709/224

[56] References Cited

U.S. PATENT DOCUMENTS

| | | | |
|---|---|---|---|
| 5,161,192 | 11/1992 | Carter et al. | 713/201 |
| 5,311,593 | 5/1994 | Carmi | 370/400 |
| 5,754,525 | 5/1998 | Lo et al. | 370/389 |
| 5,940,392 | 8/1999 | Lo et al. | 370/401 |

*Primary Examiner*—Chi H. Pham
*Assistant Examiner*—Maikhanh Tran
*Attorney, Agent, or Firm*—Wilson Sonsini Goodrich & Rosati

[57] ABSTRACT

A method for improving network security in a network that includes a star configured interconnection device such as a repeater, a bridge or a switch, that has a plurality of ports adapted for connection to respective MAC layer devices includes storing authentication data in the star configured interconnection device that maps MAC addresses of end stations in the network to particular ports on the star configured interconnection device. Upon receiving a packet on a particular port, the process involves determining whether the packet carries a source address which the authentication data maps to the particular port. If the packet carries a source address which the authentication data maps to the particular port, then the packet is accepted. If the packet does not carry a source MAC address which the authentication maps to the port, then an authentication protocol is executed on the port to determine whether the MAC address originates from an authorized sender according to the authentication protocol.

37 Claims, 3 Drawing Sheets

MEDIUM ACCESS CONTROL ADDRESS AUTHENTICATION

PRIORITY CLAIM

The present application claims priority from provisional patent application Ser. No. 60/032,842, filed Dec. 13, 1996, which provisional application is incorporated by reference as if fully set forth herein.

CROSS REFERENCE TO RELATED APPLICATION

The present application is related to U.S. patent application entitled METHOD AND APPARATUS FOR PROVIDING SECURITY IN A STAR OR HUB NETWORK CONNECTION, invented by Jain, et al., having Ser. No. 08/866,818, and filed May 30, 1997, which application is incorporated by reference as if fully set forth herein.

BACKGROUND OF THE INVENTION

1. Field of the Invention

The present invention relates to security in the data networks, and more particularly to the authentication of sources of data carrying a medium access control (MAC) layer address as a source address.

2. Description of Related Art

Many common data networks are inherently insecure. For example, Ethernet based networks involve local area network LAN segments in which every end station on a given segment is capable of reading every packet sent to any other end station on that given segment. In general, each end station in the network has a unique MAC address, and an end station reads packets on the transmission medium to determine whether they carry its unique MAC address as a destination. However, it is possible that end stations operate in a promiscuous mode, reading every packet on the transmission medium, or every packet that carries a class of MAC addresses which the end station is setup to read. For example, during configuration or debugging operations, network adapters are placed in the promiscuous mode, to read every packet on the transmission medium and pass such packets up the protocol stack for further processing.

However, promiscuous mode operation can also be used by an end station to read and examine all of the network traffic, and bypass the normal addressing in the network. This allows an end station on the network to read data that is not intended for it.

A related security problem involves end stations on the network sending outgoing packets carrying the MAC address of another end station as a source address in the packet. This allows one end station to mimic the other in a way often referred to as spoofing. Security problems arise from this mimic behavior, because for example, the source address of the packet is used as a basis for identifying participants in the network by many protocols. Network devices learn the segments of the network on which to find certain MAC addresses. Thus, by using the MAC address of another device, an end station is capable of fooling the network so that packets destined to the end station that it is mimicking, are routed to the mimic. Also, an unscrupulous user spoofing another packet can introduce unwanted data such as computer viruses into a packet stream being transmitted from the end station, or hijack a user's network session and gain unauthorized access to other system resources.

There are however, some times when an end station or other network device will want to legitimately send out a packet with a different MAC address. As one example, on Ethernet there is a concept known as transparent bridging in which an end station acts as a transparent forwarder of packets for other end stations. In some prior art systems, an adapter can take the source address from a register and insert it into a packet in order to force the MAC address.

A number of techniques have been proposed or implemented to thwart the spoofing of MAC addresses. These techniques rely on the use of look-up tables in intermediate stations, that are configured with the MAC address of authorized end stations, and mapped to particular ports on those devices. If a MAC address arrives on a port other than the port for which it has been configured, then that data packet is rejected. See, for example, U.S. Pat. No. 5,161,192 entitled REPEATERS FOR SECURE LOCAL AREA NETWORKS by Carter, et al. These prior art approaches do not detect use of a MAC address by an unauthorized sender, but rather assume that any packet carrying the correct MAC address is the authentic source of that address. Without authentication of a sender of a packet, these prior art measures can be thwarted.

Authentication of sender of data has been proposed in the prior art for higher protocol layers, such as the Internet Protocol IP layer, or in higher layers. For example, the Point-to-Point Protocol challenge handshake authentication protocol CHAP establishes a technique in the PPP protocol during establishment of a link by which the participants in the session can be authenticated. See, RFC 1994, "PPP Challenge Handshake Authentication Protocol", August 1996; see IPSEC RFCs 1825, 1826, 1827; see also ITU-T Recommendation X.509, November 1993. Of course these approaches have a disadvantage that they only operate for data packets operating under specific higher layer protocols. Many data packets in the system are used for processes which operate only at the lower layers. Such packets are able to bypass the authentication processes that the higher layer protocols execute, and introduce security risks into the network.

It is desirable to provide a more robust system for preventing the spoofing of MAC addresses in a data network. It is desirable that the system be self configuring, and have little or no impact on the host processor in which the protection is implemented. In many environments it is desirable to authenticate that the source of a packet carrying a MAC address, is in fact the end station to which that MAC address has been assigned. If this authentication can be carried out, many of the insecurities introduced by the spoofing techniques could be reduced.

Accordingly, it is desirable to provide for authentication of sources of packets at the lowest network layer possible.

SUMMARY OF THE INVENTION

The present invention provides a method for improving network security in a network that includes a star configured interconnection device such as a repeater, a bridge, a switch or a router, that has a plurality of ports adapted for connection to respective MAC layer devices. The method includes storing authentication data in the star configured interconnection device that maps MAC addresses of end stations in the network to particular ports on the star configured interconnection device. Upon receiving a packet on a particular port, the process involves determining whether the packet carries a source address which the authentication data maps to the particular port. If the packet carries a source address which the authentication data maps to the particular port, then the packet is accepted. If the packet does not carry a source MAC address which the authentication maps to the port, then an authentication protocol is executed on the port to determine whether the MAC address originates from an authorized sender according to the authentication protocol.

According to one aspect of the invention, the authentication protocol includes providing a secret value to authorized senders of MAC addresses, and challenging senders of MAC addresses to generate a response using the secret value to the port.

The authentication data according to one aspect of the invention is generated during initialization of the ports on the star configured interconnection device. Also, after executing an authentication protocol, if it is determined that the packet carrying the MAC address originates from an authorized sender according to the authentication protocol, then the authentication data is updated.

According to yet another aspect of the invention, the secret value stored in the source of a MAC address comprises an encryption key, such as the private key in a public key/private key encryption algorithm. Alternatively, the secret value comprises a password. Various levels of security can be provided, depending on the sophistication of the challenge-response protocol.

The present invention also includes a method which is executed at the end stations in such a network. According to this aspect of the invention, the method comprises storing an authentication key for a MAC address in the MAC layer device, where the authentication key is a secret value. The MAC layer device responds to a challenge from the star configured interconnection device, by sending a response based on the authentication key to the star configured interconnection device. The MAC layer device comprises a network adapter card coupled to an end station in one aspect of the invention. The authentication key is stored in non-volatile memory on the network adapter. In one example, the non-volatile memory comprises a code memory on the network adapter that is not readable by the host processor. The MAC layer device also includes resources to respond to a challenge detected in an incoming packet, by sending a response on the network based on the authentication key to the source of the challenge.

The present invention can also be characterized as a network device comprising a plurality of ports adapted for connection to respective MAC layer devices. Memory including authentication data is included. The authentication data maps MAC addresses to the ports in the plurality of ports. Processing resources in the device monitor a packet received on a particular port in the plurality of ports. If the packet carries a source address which the authentication data maps to the port, then the packet is accepted. If the packet does not carry a4 source MAC address which the authentication data maps to the port, then the authentication protocol is executed by the processing resources on the network device.

Other aspects and advantages of the present invention can be seen upon review of the figures, the detailed description and the claims which follow.

DETAILED DESCRIPTION

Figure 1:
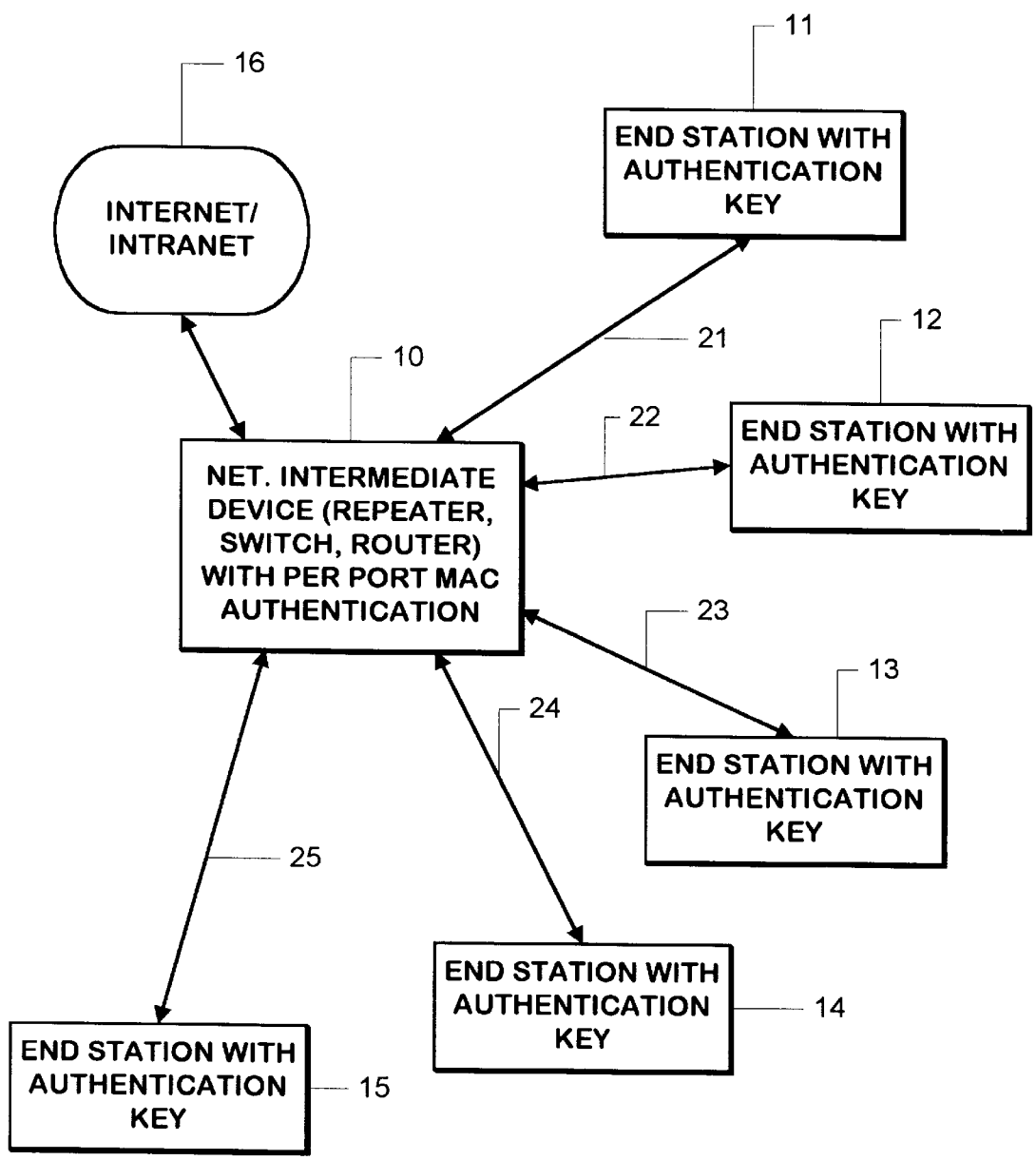
FIG. 1 is a simplified diagram of a data network implementing the per port MAC address authentication according to the present invention.

A detailed description of the present invention is provided with respect to FIGS. 1–4, in which FIG. 1 provides an overview of the environment in which the present invention is implemented. The system in which the present invention is implemented includes a network intermediate device 10, such as a repeater, a switch, a bridge, or a router, which includes resources for per port MAC authentication processes. When the network intermediate device 10 is a repeater, it includes resources which repeat a packet received on a particular port on at least one other port in the plurality of ports if the packet is accepted. When the network intermediate device comprises a bridge, the device includes resources to forward the packet on at least one other port in the plurality of ports if the MAC layer destination of the packet is not known on the port at which it was received. When the network intermediate device is a switch, then it includes resources to forward the packet on at least one other port in the plurality of ports through which the destination of the packet is known when the packet is accepted according to the authentication data. Routers include functionality similar to the switch functionality, accept that they also include higher layer protocol processing which is usually independent of the MAC layer addresses carried in the packets. The network intermediate device 10 provides for a star interconnection of a plurality of end stations 11–15. Each of the end stations 11–15 includes an authentication key for use in the authentication protocol managed by the star interconnected intermediate device 10. The intermediate device is also coupled to the balance of the Internet or Intranet as suits a particular implementation and represented by element 16.

In FIG. 1, the intermediate device 10 includes a plurality of ports. On such ports there is a single MAC layer device provided in the star configuration. Thus, the end station 11 is connected across a communication medium 21 to the intermediate device 10. The medium 21 comprises in a preferred embodiment twisted pair wiring suitable for use according to the Ethernet standard. Alternative communication media could be utilized, including fiber optic cables, coaxial cables, or other transmission media. In a similar fashion end station 12 is connected across medium 22 to a port on the intermediate device 10. End station 13 is connected across line 23 to a port on the intermediate device 10. End station 14 is connected across line 24 to a port on the intermediate station 10. End station 15 is connected across a line 25 to a port on the intermediate device 10.

According to the present invention, the network intermediate device provides for per port MAC authentication. That is, it includes data for mapping each port to a particular MAC address. When an end station, such as end station 11 sends a packet across the layer two fabric of the network through the network intermediate device 10, the source address of the packet is monitored. If the source address matches the MAC address which has been authenticated for that port, then the packet is accepted. Otherwise, the packet is discarded. Also, an authentication protocol is executed when an unauthenticated MAC address is received on the port to determine whether that MAC address originates from an authorized sender. To this end, each end station stores an authentication key or other secret value, for use in the authentication protocol. For example, the authentication protocol executed by the network intermediate device 10 with each end station on the port could be like that described in the CHAP protocol, mentioned above, which has been established for the point-to-point protocol PPP in the transport layer of the network paradigm.

Figure 2:
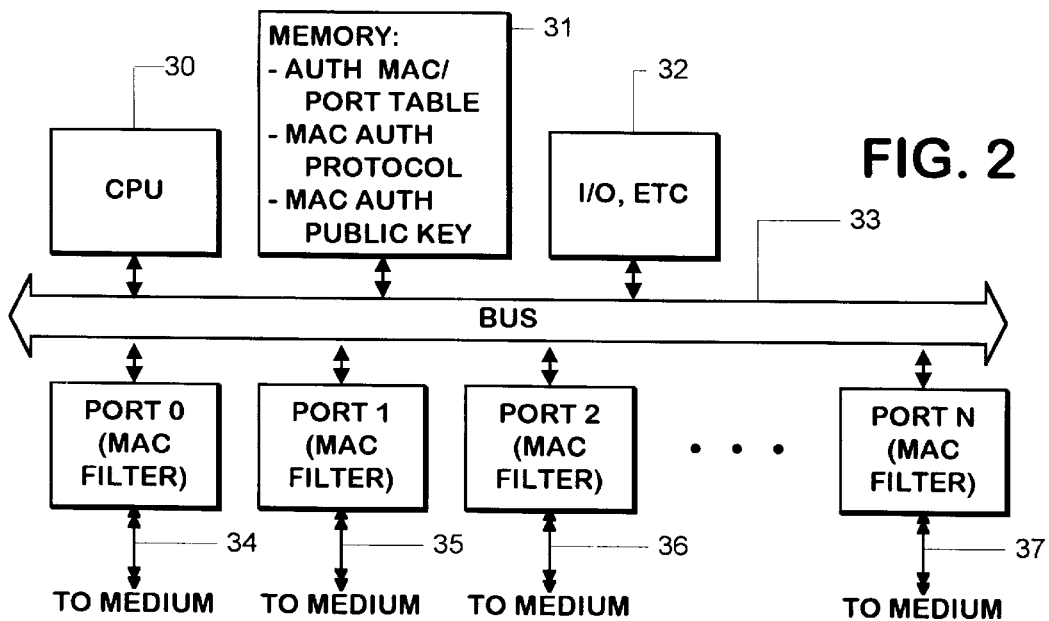
FIG. 2 is a simplified block diagram of a star configured network interconnection device including the authentication protocol of the present invention.

FIG. 2 provides a simplified diagram of a network intermediate device which acts as a star interconnection device in a network according to the present invention. The device of FIG. 2 includes a processor 30, memory 31, and input/output devices 32 as well as other features of a data processing system. The processor 30, memory 31, and input/output elements 32 are interconnected by a bus 33. Also coupled to the bus 33 are a plurality of ports, port 0, port 1, port 2, . . . . port N. Each port includes a MAC address filter by which it operates to accept or deny packets which are received on the respective port. Also each port is coupled to a respective medium, such as twisted pair cables. Thus, a physical layer connector represented by element 34 on port 0, element 35 on port 1, element 36 on port 2, and element 37 on port N is provided for each port in the intermediate device. According to the present invention, the intermediate device of FIG. 2 includes processing resources that provide for the MAC address authentication of the present invention. Thus, the authentication protocol is executed by the CPU 30 using programs stored in intermediate device memory 31. Programs contain the authentication data including a MAC/PORT table which maps individual ports in the device to specific MAC addresses which have been qualified according to the authentication protocol. The authentication protocol code is also stored in the memory of the network intermediate device. Furthermore, in one example a public key is stored enabling use of a public key/private key encryption algorithm in the challenge/response element of the authentication protocol.

Figure 3:
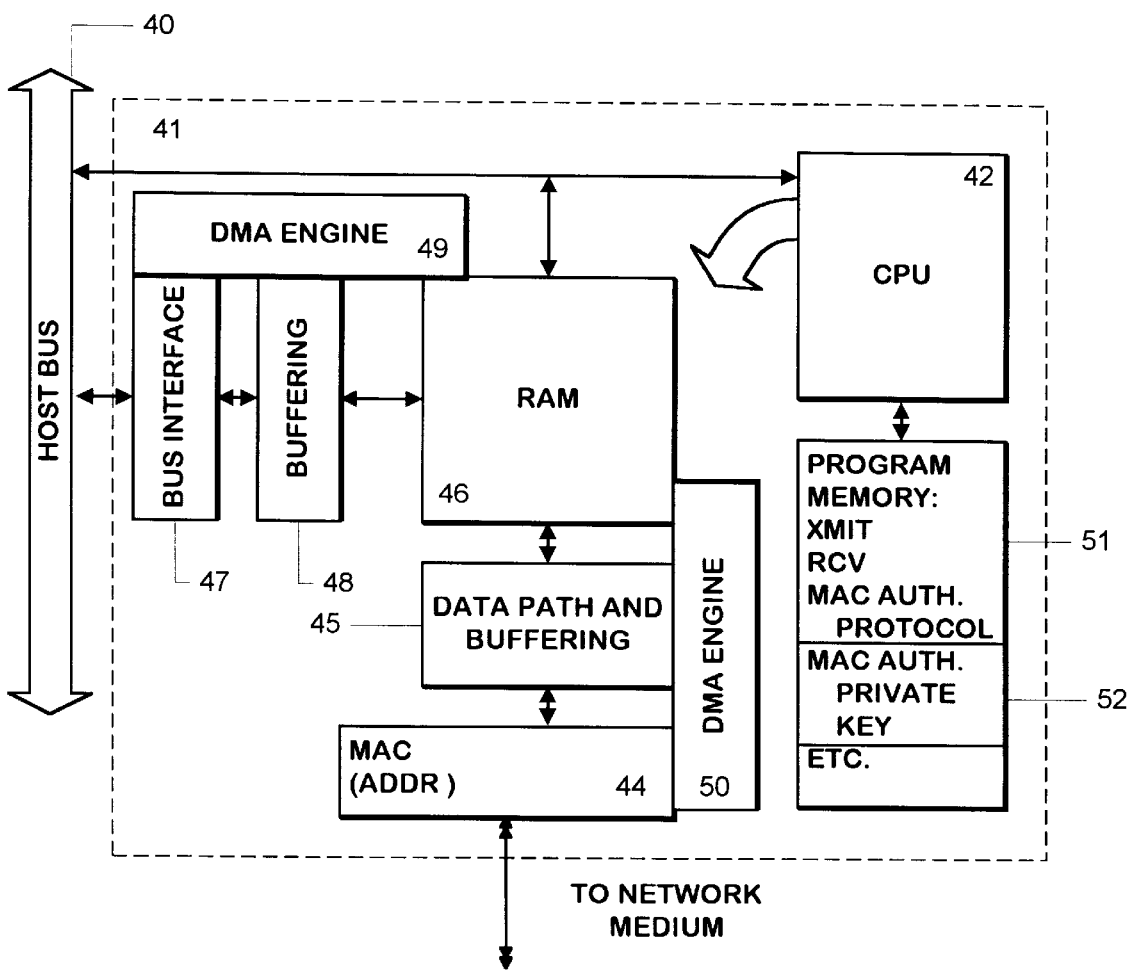
FIG. 3 is a simplified block diagram of a network interface card according to the present invention.

FIG. 3 provides a simplified diagram of a network interface card on an end station according to the present invention. The network interface card is connected to a host bus 40 in an end station. Network interface card 41 includes a processor 42, or dedicated logic which controls the transfer of data packets from the host bus 40 to the network medium across the physical interface 43. Thus, a medium access control unit 44 is included in the device 41 which includes a unique MAC address, usually assigned during manufacture. Data path and buffering logic 45 is included between the medium access control unit 44 and on card memory 46. Between the host bus 40 and the memory 46, a bus interface 47 and buffering resources 48 are provided. Also, in a preferred embodiment a DMA engine 49 is included in the path between the host bus and the memory 46. Also a DMA engine 50 is included on the data path between the medium access control unit 44 and the memory 46. The processing resources on the network interface card in this example include software stored in a program memory 51 and executed by the processor 42. As mentioned above, alternative systems can utilize dedicated logic for this purpose. Program memory includes transmit and receive processes, a MAC authentication protocol process, and a MAC authentication private key 52 or other secret value, such as a password for use in the authentication protocol. Thus, the network interface card 41 includes resources to respond to a challenge from an intermediate device, such as the device of FIG. 2 with a response that is based on the secret value, such as the private key stored on the card. This private key 52 is stored on the card and independent of the end station. In a preferred embodiment, the end station is prevented from reading the secret value stored in the network interface card, such as by storing it in a memory location that is not within the host system address space, and providing for resources such as software or dedicated logic on the network interface card for computing the challenge independent of host processing. The resources for generating the challenge response can be implemented for another example in a programmable gate array or other programmable logic on the card, or in an interface adapter chip on the card.

Figure 4:
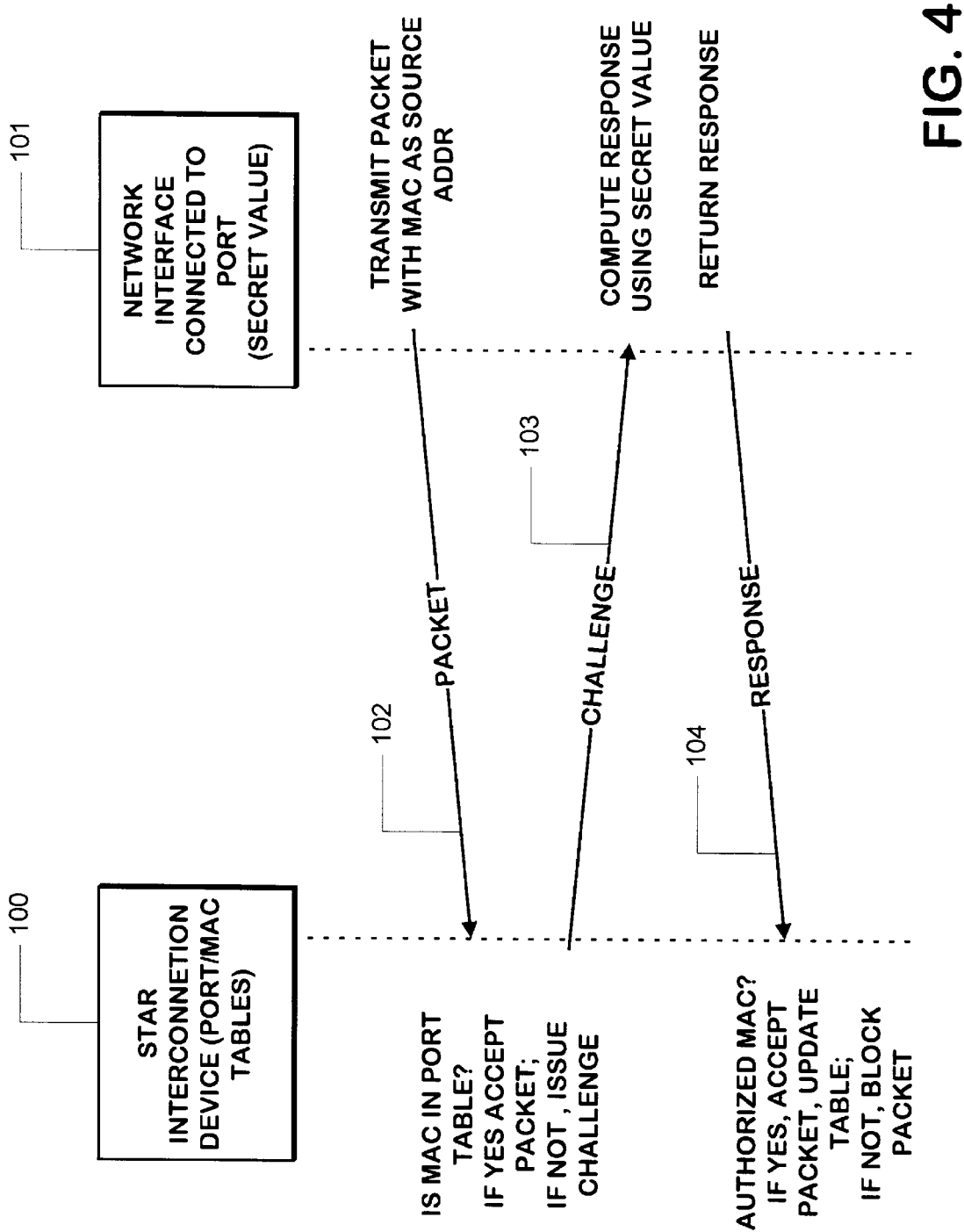
FIG. 4 is a simplified diagram of a portion of the authentication protocol of the present invention.

FIG. 4 provides an illustration of a part of one example of the authentication protocol according to the present invention. In FIG. 4, the star interconnection device is represented by unit 100. The network interface card which is connected to a port on the star interconnection device 100 is represented by unit 101. The star interconnection device 100 includes the PORT/MAC tables which map MAC addresses which have been authorized according to the authentication protocol to individual ports on the device. The network interface card 101 stores a secret value for use in the challenge response protocol. The element of the authentication protocol illustrated in FIG. 4 begins with the network interface card transmitting a packet with a particular MAC address as the source address as indicated by line 102 to the star interconnection device 100. The star interconnection device 100 determines whether the MAC address is stored in the PORT/MAC table for the particular port on which it is received. If it is in the table, then the packet is accepted. If the MAC address carried as source address in the packet is not in the table, then a challenge is issued. The packet may be discarded, or held pending outcome of the authentication protocol. The challenge is transmitted as indicated on line 103 on the port to the network interface card 101 which transmitted the packet 102. The network interface card 101 computes a response using the secret value stored in the network interface card. The response 104 is then returned to the star interconnection device 100. Upon receipt of the response 104, the star interconnection device 100 determines whether the response proves that the MAC address originated from an authorized sender according to the authentication protocol. If the user is authorized, then the packet 102 is accepted and the table stored in the star interconnection device is updated for that particular port. If the MAC address is not authorized, then the packet is blocked, and the port is disabled or other action is taken to prevent that end station from accessing the layer two fabric of the network. Further, a notification message can be sent to a network management station, indicating that a failed authentication occurred. In one alternative, one or more new authentication challenges are issued on the port until a correct response is returned.

According to alternative implementations, the challenge response protocol is generated upon initialization of the network intermediate device, or upon initialization of a particular port on the device 10. For example, the network intermediate device in one embodiment comprises a bridge or a switch which executes an auto-negotiation protocol to determine the level of resources available on the link between the network intermediate device and the end station. As a part of this protocol, the authentication process is executed upon successful negotiation of the link characteristics.

Also, the network intermediate device 10 may include resources for monitoring the link, such as by monitoring the link beat signals generated by end stations on the ports. If it is detected that the end station is turned off, or otherwise disconnected from the port, then that MAC address can be deleted from the table, and the port placed in an unauthenticated state. In the unauthenticated state, it will be required that the authentication protocol be executed before any packet is accepted on that particular port.

In summary, most network interface cards allow the system in which they are inserted to modify the MAC address which is used as a source address in outgoing packets. The present invention maintains a secret value in the network interface card, and uses the secret value to prove that the network interface card is a legitimate user of the MAC address. The network interface card connects to the layer two (data link layer) fabric of a network through a star interconnection device. In a star interconnection device there is only one network interface card connected to each port. An authentication protocol operates as follows. Initially, when the network interface card is connected to a port on the star interconnection device, that port is in an unauthenticated state. When the star interconnection device detects the presence of a network interface card, it sends to it a challenge value. When the challenge value is received by the network interface card, the network interface card uses a secret value to compute a response to the challenge. The response is then returned to the star interconnection device. Both the reception of the challenge and the transmission of the response involve only network interface card hardware functions, some combination of hardware and software functions on the network interface card, or a combination of hardware functions on the network interface card and software functions in the end system. Alternatively, purely software functions could be executed in the end system that is coupled to the network interface card. However, computation of the response is carried out by the network interface card based on the secret value it holds. The star interconnection device receives the response and determines whether it demonstrates that the network interface card is a legitimate user of the MAC address in the packet. The star interconnection device may establish the legitimate use by sharing the secret value with the network interface card, or by some other means.

In one example, public key/private key encryption is used. The adapter card stores a private key. The star interconnection device stores, or otherwise has access to a certificate binding a MAC address on a port to a public key. To authenticate the adapters use of a MAC address, the star interconnection device issues a challenge to the adapter. The adapter uses the private key to encrypt the challenge, or some derivative of it, and returns the encrypted value to the star interconnection device. The star interconnection device decrypts the returned value using the public key and determines whether a match is made with the challenge. In another approach, the star interconnection device encrypts a response using the public key, and issues the encrypted response to the adapter. The adapter decrypts using the private key and returns the decrypted response to the star interconnection device, where a comparison is made to authenticate the use by the adapter of the MAC address on the port.

If the MAC address is authenticated, the star interconnection device binds the port to which the network interface card is connected to the MAC address that was authenticated. The star interconnection device monitors the port to which the network interface card is connected, and if it detects that the connectivity between the card and the port is interrupted, it places the port back into the unauthenticated state.

Thus, according to the present invention, an authentication protocol is provided in layer 2 of the network fabric, the lowest layer in the network in which addresses are utilized to identify sources and destinations of packets. By providing for authentication at the lowest layer of the network, an important class of security problems is solved.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for improving network security in a network including a star configured interconnection device having a plurality of ports adapted for connection to respective MAC layer devices, comprising:

storing authentication data in the star configured interconnection device, the authentication data mapping MAC adresses to ports in the star configured interconnection device;

receiving a packet on a port;

accepting the packet carries a source MAC address which the authentication data maps to the port; and executing an authentication protocol on the port to determine whether the MAC address originates from an authorized sender according to the authentication protocol when the packet does not carry a source MAC address which the authentication data maps to the port.

2. The method of claim 1, wherein the authentication protocol includes:

providing a secret value to authorized senders of MAC addresses; and challenging senders of MAC addresses to generate a response to the port using the secret value.

3. The method of claim 1, including:

if the MAC addresses originate from an authorized sender according to the authentication protocol, then updating a table.

4. The method of claim 1, including:

generating an authentication table during initialization of ports on the star configured interconnection device.

5. The method of claim 1, including monitoring activity on the plurality of ports to detect disconnection of a MAC layer device from the ports, and upon detecting disconnection on a particular port, then updating the authentication data to unauthenticate a MAC address mapped to the particular port.

6. The method of claim 2, wherein the secret value comprises an encryption key.

7. The method of claim 2, wherein the secret value comprises a password.

8. The method of claim 2, wherein the secret value comprises a private key for a public key/private key encryption algorithm.

9. The method of claim 1, wherein the authentication data comprises a table storing authenticated MAC addresses for ports on the star configured interconnection device.

10. The method of claim 1, wherein the star configured interconnection device comprises a repeater.

11. The method of claim 1, wherein the star configured interconnection device comprises a bridge.

12. The method of claim 1, wherein the star configured interconnection device comprises a switch.

13. A method for improving network security in a network including a star configured interconnection device having a plurality of ports adapted for connection to respective MAC layer devices, comprising:

storing an authentication key for a MAC address in a MAC layer device;

responding at the MAC layer device to a challenge from the star configured interconnection device, by sending a response based on the authentication key to the star configured interconnection device.

14. The method of claim 13, wherein the MAC layer device comprises a network adapter.

15. The method of claim 14, wherein the step of storing includes storing the authentication key in a non-volatile memory on the network adapter.

16. The method of claim 14, wherein the step of storing includes providing code memory in the network adapter that is not readable by a host processor, and storing the authentication key in the code memory.

17. The method of claim 13, wherein the authentication key comprises an encryption key.

18. The method of claim 13, wherein the authentication key comprises a password.

19. The method of claim 13, wherein the authentication key comprises a private key for a public key/private key encryption algorithm.

20. A network device, comprising:
   a plurality of ports adapted for connection across a transmission medium to respective MAC layer devices;
   memory including authentication data, the authentication data mapping MAC addresses to ports in the plurality of ports;
   processing resources which monitor a packet on a particular port in the plurality of ports, wherein the packet is accepted when the packet carries a source MAC address which the authentication data maps to the port, wherein an authentication protocol is executed on the port to determine whether the MAC address originates from an authorized sender according to authentication protocol when the packet does not carry a source MAC address which the authentication data maps to the port.

21. The network device of claim 20, wherein a secret value is provided to authorized senders of MAC addresses, and the authentication protocol includes:
   resources which challenge senders of MAC addresses to generate a response to the port using the secret value.

22. The network device of claim 20, including:
   resources which, if the MAC addresses originate from an authorized sender according to the authentication protocol, then update the authentication data.

23. The network device of claim 21, including:
   resources to generate the authentication table during initialization of ports in the plurality of ports.

24. The network device of claim 21, wherein the secret value comprises an encryption key.

25. The network device of claim 21, wherein the secret value comprises a password.

26. The network device of claim 21, wherein the secret value comprises a private key for a public key/private key encryption algorithm.

27. The network device of claim 20, wherein the authentication data comprises a table storing authenticated MAC addresses for ports on the star configured interconnection device.

28. The network device of claim 20, including resources to repeat the packet on at least one other port in the plurality of ports if the packet is accepted.

29. The network device of claim 20, including resources to forward the packet on at least one other port in the plurality of ports if the MAC layer destination of the packet is not known on the particular port, if the packet is accepted.

30. The network device of claim 20, including resources to forward the packet on at least one other port in the plurality of ports through which the destination of the packet is known, if the packet is accepted.

31. The network device of claim 20, including resources which monitor activity on the plurality of ports to detect disconnection of a MAC layer device from the ports, and upon detecting disconnection on a particular port, then update the authentication data to unauthenticate a MAC address mapped to the particular port.

32. A network adapter, comprising:
   a medium access control unit having a MAC address;
   memory storing an authentication key for the MAC address; and
   resources which respond to a challenge received at the medium access control unit by sending a response based on the authentication key through the medium access control unit.

33. The network adapter of claim 32, wherein the memory storing the authentication key comprises non-volatile memory.

34. The network adapter of claim 32, wherein the memory storing the authentication key is not accessible by the host processor coupled to the network adapter.

35. The network adapter of claim 32, wherein the authentication key comprises an encryption key.

36. The network adapter of claim 32, wherein the authentication key comprises a password.

37. The network adapter of claim 32, wherein the authentication key comprises a private key for a public key/private key encryption algorithm.

* * * * *